United States Patent

Hamann et al.

[11] Patent Number: 5,535,959
[45] Date of Patent: Jul. 16, 1996

[54] TENSION REDUCING RETRACTOR WITH REDUCED VELOCITY RATCHET

[75] Inventors: Russell E. Hamann, Rochester Hills, Mich.; Christopher S. Koprowicz, Mission, Tex.; Carl M. Petersen, III, Waterford, Mich.

[73] Assignee: TRW Vehicle Safety Systems Inc., Lyndhurst, Ohio

[21] Appl. No.: 391,940

[22] Filed: Feb. 21, 1995

[51] Int. Cl.$^6$ .................................................. B60R 22/44
[52] U.S. Cl. ......................................................... 242/372
[58] Field of Search ........................... 242/372; 280/806, 280/807; 297/475, 476, 477, 478

[56] References Cited

U.S. PATENT DOCUMENTS

| | | | |
|---|---|---|---|
| 4,162,772 | 7/1979 | Shimogawa et al. | 242/372 |
| 4,711,408 | 12/1987 | Mori | 242/372 |
| 4,763,853 | 8/1988 | Andersson . | |
| 4,768,733 | 9/1988 | Willey . | |
| 4,989,804 | 2/1991 | Ebner et al. . | |
| 5,080,298 | 1/1992 | Sasaki et al. | 242/372 |
| 5,255,868 | 10/1993 | Reulein | 242/372 |
| 5,297,752 | 3/1994 | Brown et al. . | |

*Primary Examiner*—John M Jillions
*Attorney, Agent, or Firm*—Tarolli, Sundheim, Covell, Tummino & Szabo

[57] ABSTRACT

A seat belt retractor (10) includes a seat belt storage spool (14) on which a seat belt (16) is wound. The spool 14 is rotatable in belt retraction and belt withdrawal directions (A, B). First and second springs (50, 52) act in series and bias the spool (14) to rotate in the belt retraction direction. A ratchet wheel (54) is connected between the first and second springs (50, 52) and blocks the spring force of the first spring (50) from biasing the spool (14) in the belt retraction direction. The ratchet wheel (54) has a plurality of teeth (78). The ratchet wheel (54) is rotatable when blocking of the spring force of the first spring (50) does not occur and is stationary when blocking does occur. A pawl (56) is movable by an actuator (60) for selectively engaging a tooth (78) of said ratchet wheel (54) to prevent rotation of said ratchet wheel (54). An inertia mass member (81) is mounted on the ratchet wheel (54) to increase the overall rotational inertia of the ratchet wheel (54) and thereby retard the rotational velocity of the ratchet wheel (54) upon release of the pawl (56) from the ratchet wheel (54).

15 Claims, 3 Drawing Sheets

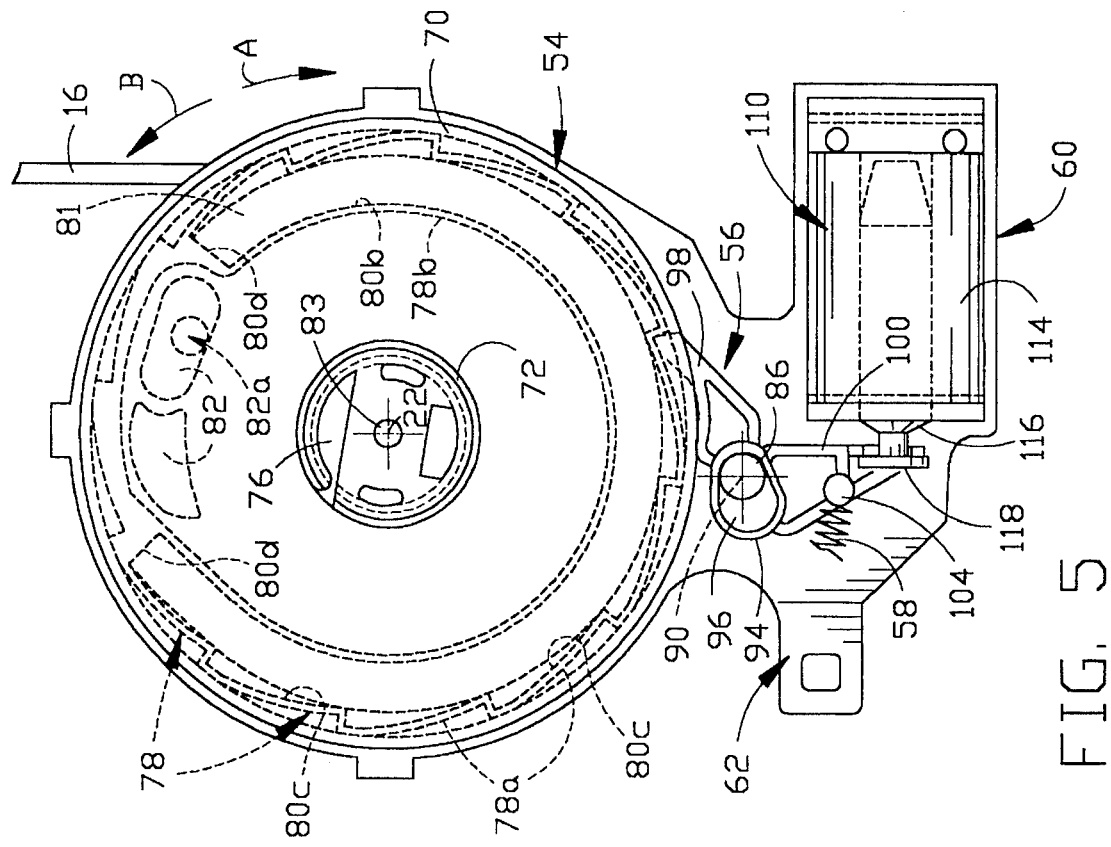
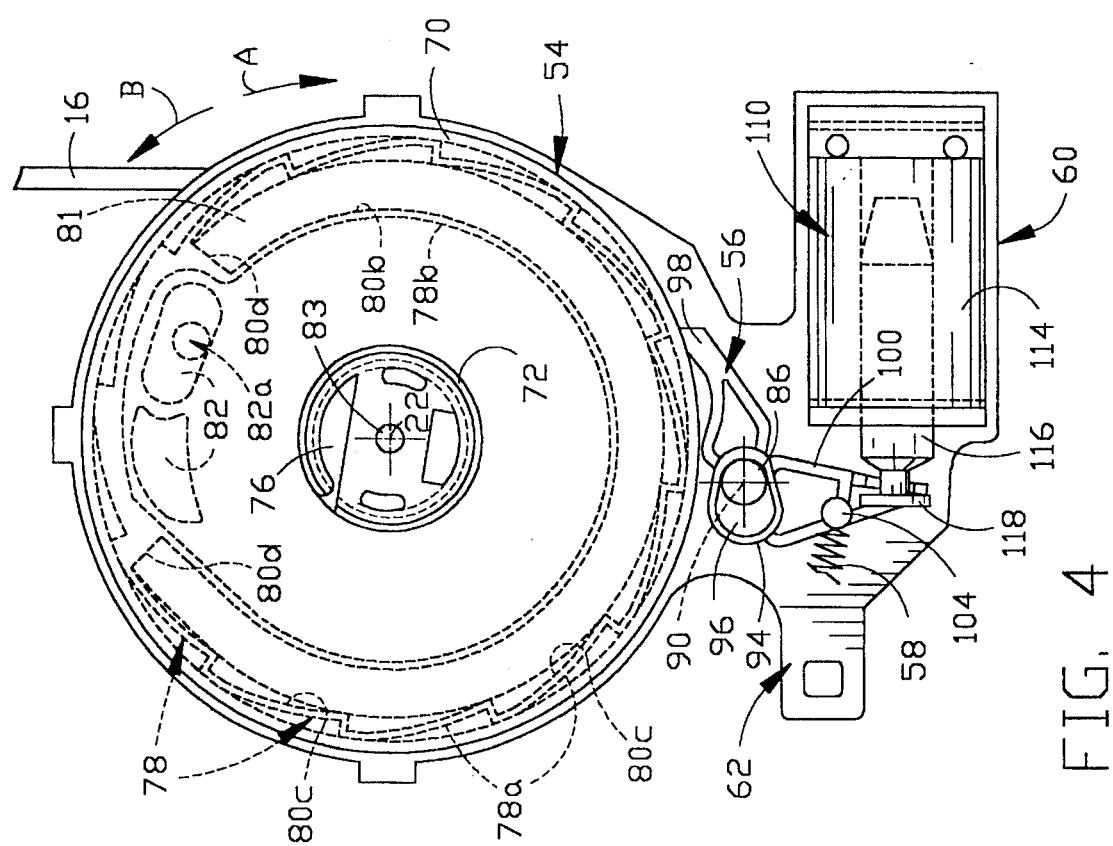

TENSION REDUCING RETRACTOR WITH REDUCED VELOCITY RATCHET

BACKGROUND OF THE INVENTION

The present invention relates to a vehicle seat belt retractor which has a tension reducing mechanism for reducing the tension in a seat belt that extends around a vehicle occupant.

One known seat belt retractor has two springs for biasing a seat belt storage spool to rotate in a belt retraction direction relative to a housing. The two springs are connected in series with a ratchet wheel interposed between the two springs. One end of the first spring is fixed relative to the housing, and the other end is attached to act on the ratchet wheel. One end of the second spring is attached to the ratchet wheel, and the other end is attached to act on the spool. Upon withdrawal of the stored seat belt from the spool, the ratchet wheel is rotated in a belt withdrawal direction, and the first and second springs are stressed.

The retractor has a mechanism which is actuatable to block rotation of the ratchet wheel relative to the frame in the belt retraction direction. Thus, when the mechanism is actuated, only the spring force of the second spring is applied to bias the spool. Thus, a reduced tension is placed upon the seat belt and the seat belt applies a reduced tension force to the vehicle occupant.

The first spring has a stronger spring force than the second spring. When the mechanism which blocks rotation of the ratchet wheel is deactuated, the ratchet wheel is permitted to rotate in the belt retraction direction, and the first spring drives the ratchet wheel in the belt retraction direction. The rotating ratchet wheel accelerates to a relatively high velocity and winds the second spring as a result of the larger spring force of the first spring being applied to the weaker second spring. If sufficient stress is present in the first spring, the second spring may be wound solid. Repeated application of the force of a highly stressed first spring on the second spring may cause unnecessary stress in the second spring.

SUMMARY OF THE INVENTION

The present invention is a seat belt retractor which can provide a reduced tension in a seat belt. The retractor includes a seat belt storage spool on which the seat belt is wound. The spool is rotatable about a spool axis in belt retraction and belt withdrawal directions. A spring means biases the spool to rotate in the belt retraction direction. A wheel means selectively blocks a tension force of the spring means from acting on the spool to reduce tension in the seat belt. The wheel means is rotatable about a wheel axis when the wheel means does not block the tension force and is stationary when it blocks the tension force. A pawl means selectively engages the wheel means to hold the wheel means stationary. An actuator means moves the pawl means into engagement with the wheel means. An inertia mass member is mounted on the wheel means at a distance spaced from the wheel axis for increasing the rotational inertia of the wheel means to retard rotational velocity of the wheel means upon release of the pawl means from the wheel means. Preferably, the inertia mass member is made of a relatively high density material such as metal, and the wheel means is made of a relatively low density material such as plastic.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a view taken along line 4—4 of FIG. 1 with certain parts removed for clarity and showing certain parts in a first operational position; and FIG. 5 is a view similar to FIG. 4 showing certain parts in a second operational position.

DESCRIPTION OF PREFERRED EMBODIMENT

Figure 1:
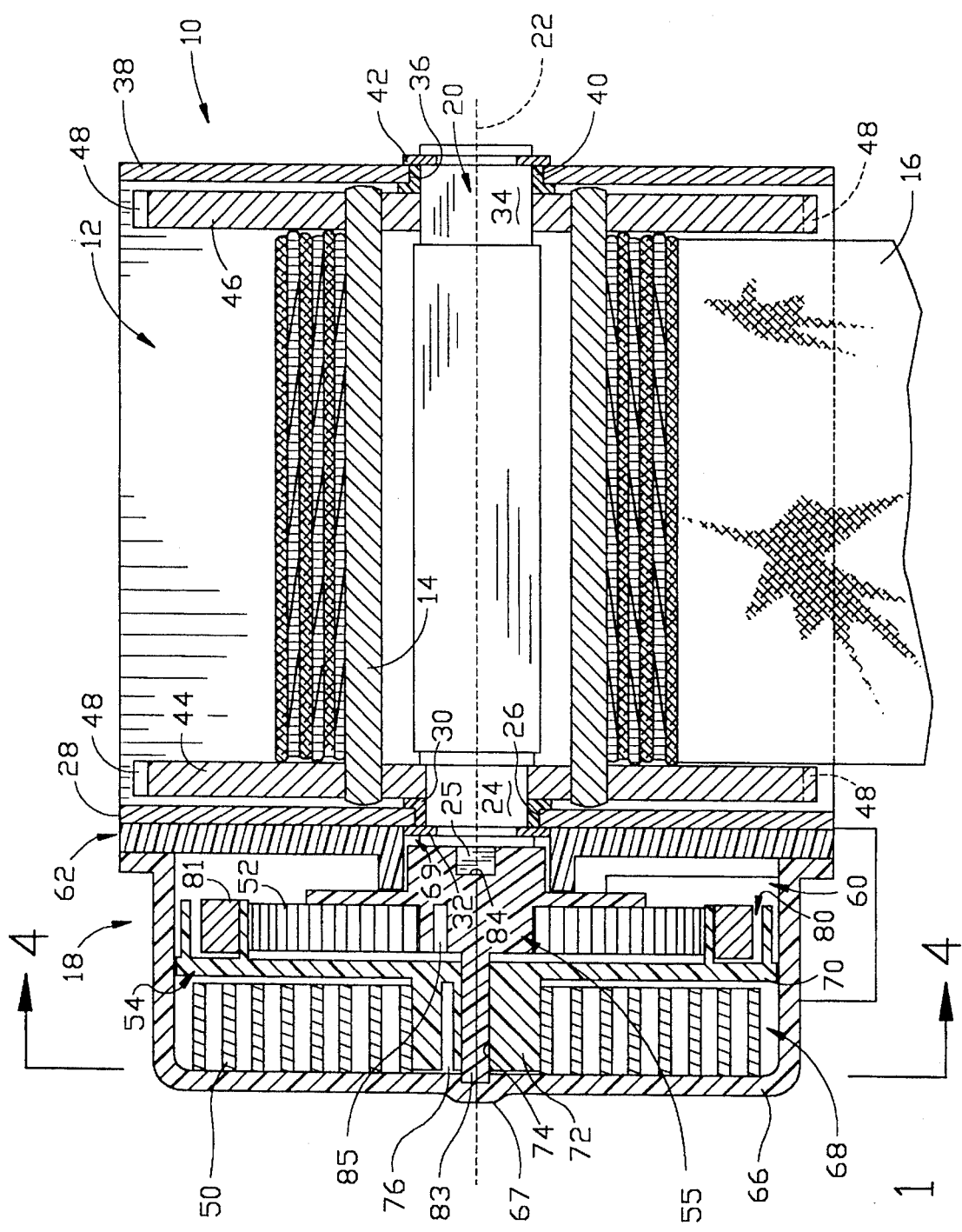
FIG. 1 is a sectional view of a seat belt retractor embodying the present invention.

A seat belt retractor 10 according to the present invention is shown in FIG. 1. The retractor 10 includes a frame 12, a belt storage spool 14 and a drive assembly 18. The frame 12 is metal and adapted to be mounted in a vehicle. A length of seat belt 16 is wound on the spool 14. A sewn loop at the end of the seat belt 16 extends through the spool 14 and about a cylindrical shaft 20 to secure the seat belt 16, as is known. The spool 14 is coaxial with and is fixed for rotation with the shaft 20 about an axis 22, in a seat belt retraction (winding) direction A (FIG. 4) and a seat belt withdrawal direction B, as is known.

A first end portion 24 (FIG. 1) of the shaft 20 extends through a circular opening 26 in one side 28 of the frame 12, and is supported in the opening 26 by a bearing 30. A retainer 32 engages the first end portion 24 of the shaft 20 for limiting axial movement of the shaft 20. The first end portion 24 has an axially extending drive projection 25. A second end portion 34 of the shaft 20 extends through a circular opening 36 in the other side 38 of the frame 12, and is supported by a bearing 40. A retainer 42 engages the second end portion 34 also for limiting axial movement of the shaft 20.

Two spool locking metal ratchet wheels 44 and 46 are fixed to rotate with the spool 14 and shaft 20. Each of the ratchet wheels 44 and 46 has a plurality of teeth 48 located about its circumference. A metal locking pawl (not shown) is pivotally mounted for engagement with the teeth 48 of the ratchet wheels 44 and 46 to block rotation of the spool 14 in the belt withdrawal direction B. A mechanism (not shown), such as an inertia mass sensor assembly, causes the locking pawl to engage the ratchet wheels 44 and 46 upon the occurrence of vehicle deceleration above a predetermined deceleration. Also, the rotation of the spool 14 could be blocked by a mechanism (not shown) in a known manner upon withdrawal of the seat belt 16 and rotation of the spool 14 in the withdrawal direction B above a predetermined withdrawal speed.

The drive assembly 18 is mounted on the side 28 of the frame 12 and provides a force for biasing the shaft 20 and the spool 14 to rotate in the belt retraction direction A. The drive assembly 18 includes a first spring 50, a second spring 52, a ratchet wheel 54 and a hub 55, all of which are located coaxially about the axis 22. The first and second springs 50 and 52 are shown in FIG. 1, but are not shown in FIGS. 2, 4 and 5 for clarity. The drive assembly 18 further includes a pawl 56 (FIG. 2), a pawl spring 58, an actuator 60, a cap plate 62 and a cover 66 (FIG. 1). The cover 66 is not shown in FIGS. 4 and 5 for clarity.

The cover 66 and the cap plate 62 comprise a housing of the drive assembly 18 which is fixed relative to the frame 12. The cover 66 is made of plastic and has a boss 67 centered on the axis 22. The cap plate 62 is made of plastic has an opening 69 that is also centered on the axis 22. The end portion 24 of the shaft 20 extends into the opening 69 of the cap plate 62. The first spring 50, the second spring 52, the ratchet wheel 54, the hub 55, the pawl 56 (FIG. 2), the pawl spring 58 and the actuator 60 are located within a hollow interior 68 (FIG. 1) of the cover 66 and are enclosed by the cover 66 and the cap plate 62. Both the cover 66 and the cap plate 62 are fixed to the side 28 of the frame 12.

The ratchet wheel 54 is rotatable about the axis 22 relative to the cover 66 and the frame 12, and is made of a relatively low density material such as plastic. A disk portion 70 of the ratchet wheel 54 extends in a plane perpendicular to the axis 22 and a projection 72 extends from the disk portion along the axis 22. An axial aperture 74 extends longitudinally through the projection 72, and a spring slot 76 is located in the projection 72 radially offset from the aperture. A plurality of teeth 78 (FIG. 2) having sloped outer surfaces 78a extend in an annular array along an outer periphery of the disk portion 70. The annular array has an annular inner surface 78b which defines a hollow interior 79 of the ratchet wheel 54. The disk portion 70 defines a bottom of the hollow interior 79.

Figure 3:
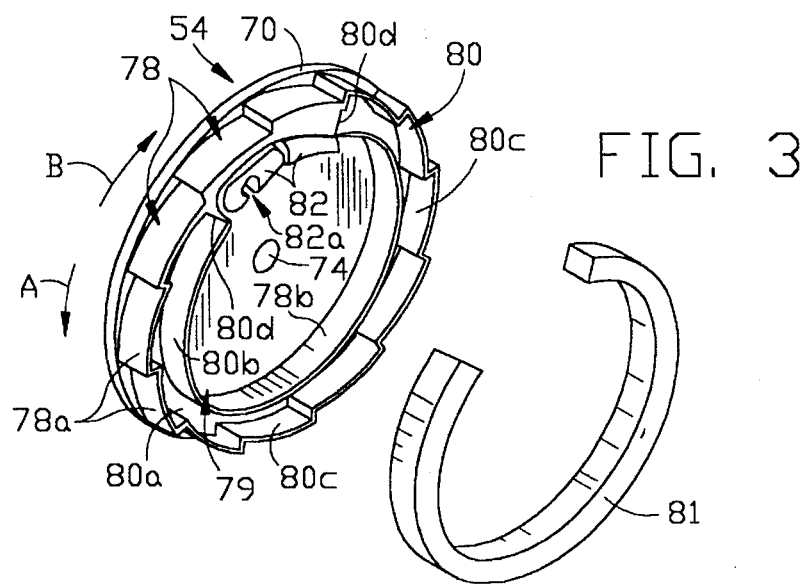
FIG. 3 is an exploded perspective view of two parts of the seat belt retractor.

The annular array itself is hollow along a majority of its circular extend to define a receiving recess 80 (FIG. 3). The recess 80 is defined by a bottom surface 80a, a side surface 80b, and a plurality of side surface segments 80c. In the embodiment shown in the Figures, the bottom surface 80a is on the disk portion 70. Also in the embodiment shown in the figures, the plurality of surface segments 80c follow the contour of the outer surface of the teeth 78. In the alternative, instead of the plurality of surface segments 80c, a single smooth surface which does not follow the contour of the outer surfaces of the teeth 78 may be used.

The recess 80 extends along an arc located radially inward of the outer surfaces of the teeth 78. The recess 80 terminates at end surfaces 80d. The ends of the recess 80 are located adjacent to a segment of the annular array of teeth 78 which is thinned.

Two spring anchor projections 82 are located adjacent to this thinned segment. The spring anchor projections 82 extend axially from the disk portion 70 and are located in the hollow interior 79 of the ratchet wheel 54, just radially inward of the teeth 78. One of the spring anchor projections 82 (FIG. 4) has a generally oval outer profile, when viewed axially, and a slot 82a. The slot 82a extends axially and is open at the outer profile. The other spring anchor projection 82 has an outer profile, when viewed axially, which has a convex portion adjacent the annular array of teeth 78 and a concave portion facing the first spring anchor projection 82.

A ring-like inertia mass member 81 is located in the recess 80, extends in the same arc as the recess 80 and has a general "C" shape (FIG. 3). Alternatively, the recess 80 and the inertia mass member 81 could extend completely around the axis 22. The inertia mass member 81 (FIG. 2) is affixed to the ratchet wheel 54 for rotational movement with the ratchet wheel by any suitable means such as adhesive or mechanical fasteners. The inertia mass member 81 is made of relatively high density material such as metal, preferably lead or steel, and provides for an increased total rotational inertia of the ratchet wheel 54.

The hub 55 is made of plastic, and has a disk-shaped main body portion 87. The hub 55 also has a support shaft 83 projecting axially in one direction from the main body portion 87 and a boss 89 projecting axially from the main body portion in the opposite direction. An engagement detent 84 is formed in the boss 89, and a spring slot 85 (FIG. 1) is formed adjacent the support shaft 83. The support shaft 83 extends axially through the aperture 74 of the ratchet wheel 54 and is supported for rotation in the boss 67 of the cover 66. The ratchet wheel 54 is rotatably supported on the support shaft 83. The boss 89 of the hub 55 extends into opening 69 of the cap plate 62 and is mated with the shaft 20. The drive projection 25 of the shaft 20 engages the detent 84 in the boss 89, such that the hub 55 is fixed for rotation with the shaft 20.

Each of the first and second springs 50 and 52 is a coil spring, with a plurality of coils, made of spring steel. The first spring 50 is located with its coils extending around the projection 72 of the ratchet wheel 54. A first end portion (not shown) of the first spring 50 is affixed to the cover 66 by a fastener (not shown). The second end portion (not shown) of the first spring 50 is fitted into the spring slot 76 of the ratchet wheel 54 and is fixed for rotation with the ratchet wheel 54. Thus, the first spring 50 acts between the cover 66, which fixed to the frame 12, and the ratchet wheel 54.

The second spring 52 is located in the hollow interior 79, concentrically within the ring array of teeth 78 of the ratchet wheel 54. A first end portion (not shown) of the second spring 52 is connected with the spring projections 82 (FIG. 2) of the ratchet wheel 54 and is fixed for rotation with the ratchet wheel 54. Specifically, a tip segment of the first end portion extends into the slot 82a and a segment wraps around the outer profile of the first spring anchor projection 82. The concave portion on the second spring anchor projection helps to trap and hold the wrapped segment of the second spring 52 on the first spring anchor projection 82. The second end portion (not shown) of the second spring 52 is fitted into the spring slot 85 (FIG. 1) of the hub 55 and is fixed for rotation with the hub 55. Thus, the second spring 52 acts between the ratchet wheel 54 and the hub 55.

The first and second springs 50 and 52 act in series, through the ratchet wheel 54, to bias the hub 55 and the shaft 20 to rotate in the belt retraction direction A relative to the frame 12. When the seat belt 16 is withdrawn from the spool 14, the hub 55 is rotated in the belt withdrawal direction B. Rotation of the hub 55 in the belt withdrawal direction B causes the coils of the second spring 52 to tighten against the hub 55.

As the coils of the second spring 52 tighten, the ratchet wheel 54 is biased to rotate about the axis 22 in the belt withdrawal direction B. When the ratchet wheel 54 is rotated in the belt withdrawal direction B, the coils of the first spring 50 tighten against the projection 72. Thus, as the seat belt 16 is withdrawn from the spool 14, the first and second springs 50 and 52 provide an increasing combined spring force biasing the shaft 20 and the spool 14 to rotate in the belt retraction direction A. The first spring 50 is stronger than the second spring 52 and provides a greater spring force. Because the second spring 52 is weaker, the second spring 52 tends to be wound tight while the first spring 50 remains only partially tightened.

The pawl 56 (FIG. 2) is made of plastic and is mounted on a pawl mounting post 86. The pawl mounting post 86 extends from a post hole 88 in the cap plate 62 along a pawl axis 90 (FIG. 4) parallel to the axis 22. The pawl 56 includes a body 94, a tooth engagement arm 98 and a solenoid engagement arm 100. The body 94 has a slot 96 which is elongated in a direction generally perpendicular to the direction of the pawl axis 90. The pawl mounting post 86 extends through the slot 96 and supports the pawl 56 for pivotal movement about the pawl axis 90 and for transverse sliding movement along the slot 96 relative to the pawl mounting post 86.

The tooth engagement arm 98 extends radially from the body 94, generally upward at an angle as viewed in the Figures. The tooth engagement arm 98 is positioned for selective engagement with one of the teeth 78 on the ratchet wheel 54. The solenoid engagement arm 100 extends radially from the body 94, generally downward as viewed in the Figures.

The solenoid engagement arm 100 includes a spring mount 104 (FIG. 2) and a pin engagement socket 106. The pawl spring 58, which is a tension spring, is connected at one end to the spring mount 104. The other end of the pawl spring 58 is attached to the cover 66. The pawl spring 58 biases the pawl 56 to a first position (FIG. 4) such that the pawl mounting post 86 is located at a first end of the slot 96 and the tooth engagement arm 98 is pivoted about the axis 90 (clockwise, as shown in FIG. 4) away from the teeth 78 of the ratchet wheel 54.

The actuator 60 includes an electrical solenoid 110. The solenoid 110 has an electrical coil 114 which is fixed to the cover 66, and a movable metallic pin 116. The solenoid 110 has electrical leads 115 (FIG. 2) connected to a source of electrical energy (not shown) and a controlling switch, such as a buckle sensor 117 on a seat belt buckle 119 (schematically illustrated), for activation of the solenoid 110. The buckle sensor 117 senses the latching of a tongue 120 in the buckle 119. During activation of the solenoid 110 (FIG. 5), the coil 114 of the solenoid is electrically excited and an electromagnetic field is created which draws the pin 116 into the coil 114. When the solenoid 110 is deactivated (FIG. 4), the pin 116 is not held in the coil 114 and the pin 116 is free to move partially out of the coil 114.

The pin 116 has a head 118. The head 118 fits into the pin engagement socket 106 on the solenoid engagement arm 100 of the pawl 56. Movement of the pin 116 upon activation of the solenoid 110 causes the pawl 56 to pivot (counterclockwise, as shown in FIG. 5) about the pawl axis 90 into engagement with a tooth 78 on the ratchet wheel 54. Also, the pin 116 is movable with the solenoid engagement arm 100 of the pawl 56 under the bias of the pawl spring 58.

The actuator 60, when actuated to move the pawl 56 into engagement with a tooth 78 on the ratchet wheel 54, causes the pawl 56 to block rotation of the ratchet wheel 54 in the belt retraction direction A relative to the cover 66 and the frame 12. When the ratchet wheel 54 is held stationary, it prevents the first spring 50 from applying its spring force to bias the spool 14 (FIG. 1) to rotate in the belt retraction direction A. Thus, only the second spring 52 acts to bias the spool 14 in the belt retraction direction A. A reduced tension force is transmitted by the seat belt 16 to the vehicle occupant.

During initial withdrawal of the seat belt 16 from the spool 14 against the force of both springs 50 and 52, the tongue 120 is not yet latched in the buckle 119. Thus, the solenoid 110 is not active. The pin 116 is located partially out of the coil 114 (FIG. 4) because the pin 116 is not yet biased by the electromagnetic field force and is only biased by the pawl spring 58 attached to the pawl 56. The pawl spring 58 biases the pawl 56 to its first position such that the tooth engagement arm 98 is not in engagement with any of the teeth 78 on the ratchet wheel 54.

Figure 2:
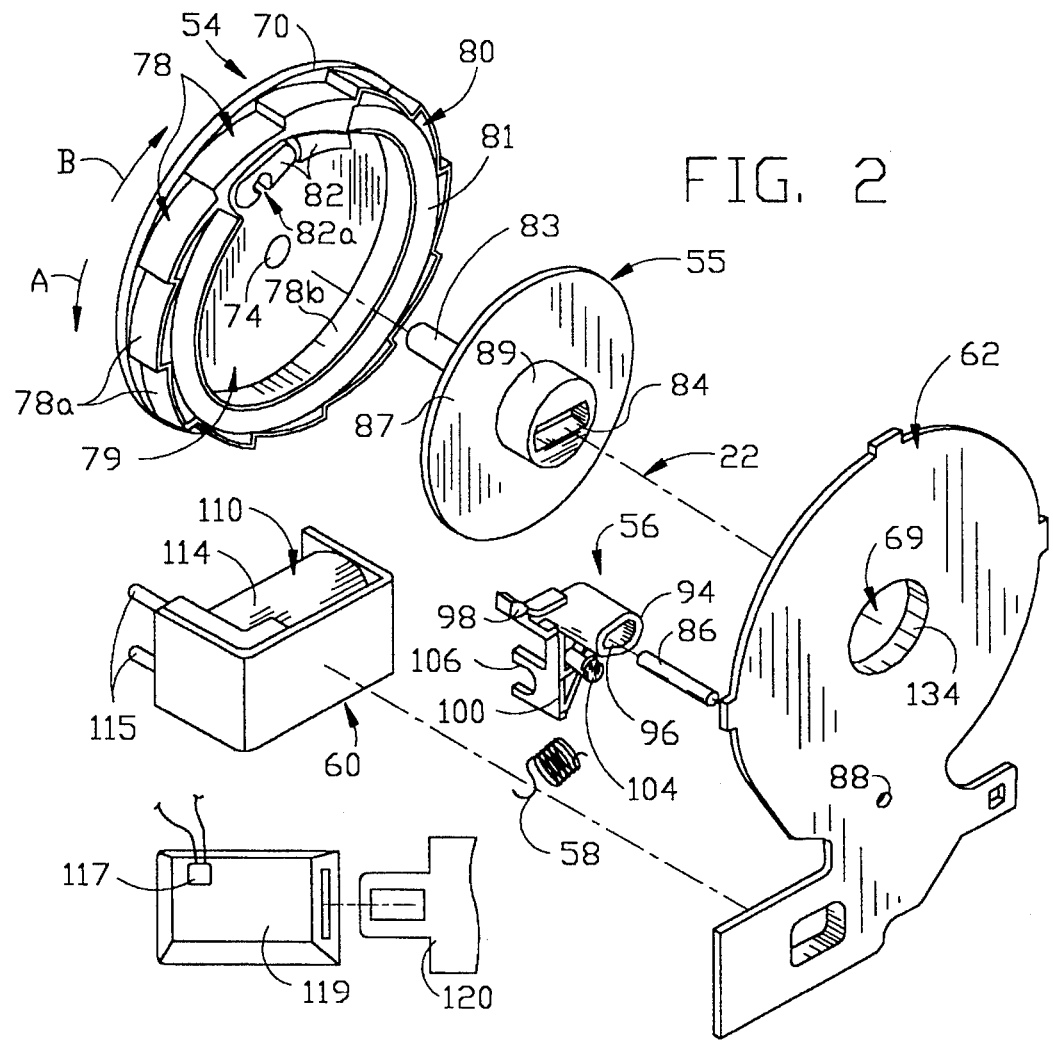
FIG. 2 is an exploded perspective view of a portion of the seat belt retractor of FIG. 1 with certain parts removed for clarity.

Once the vehicle occupant withdraws a sufficient length of the seat belt 16, the occupant can secure the seat belt 16 in position extending across the occupant by latching the buckle 119 (FIG. 3) and the tongue 120. As the seat belt 16 is secured across the vehicle occupant, the solenoid 110 is electrically activated (FIG. 5) by closing of the buckle sensor 117 (FIG. 2). The activation of the solenoid 110 causes the coil 114 to draw the pin 116 into the coil 114 because the electromagnetic field force of the solenoid 110 overcomes the force of the pawl spring 58.

The pin 116 pulls on the solenoid engagement arm 100 and pivots the pawl 56 about the pawl axis 90 (counterclockwise, as shown in FIG. 5). The tooth engagement arm 98 is pivoted into engagement with one of the teeth 78 on the ratchet wheel 54. Thus, the ratchet wheel 54 is prevented from rotating in the belt retraction direction A. The ratchet wheel 54 is held stationary relative to the fixed housing defined by the cap plate 62 and the cover 62, and the first spring 50 cannot apply a spring force to bias the spool 14.

Often, when a vehicle occupant withdraws a length of the seat belt 16 to extend the seat belt across his or her body, a slight excess of the seat belt 16 is withdrawn. This slight excess of seat belt 16 is wound back onto the spool 14 after latching the tongue 120 in the buckle 119 due to the bias of the second spring 52. When the excess seat belt 16 is wound back onto the spool 14, the stress in the second spring 52 is reduced.

If movement of the vehicle occupant, such as reaching to unlock an opposite door, necessitates that an additional amount of seat belt 16 be withdrawn from the spool 14, such additional seat belt 16 is provided by rotation of the shaft 20 in the belt withdrawal direction B. If the second spring 52 is sufficiently tightened, the ratchet wheel 54 tends to rotate in the withdrawal direction B (counter-clockwise, as shown in FIG. 5). This rotation is permitted by the sloped surfaces of the teeth 78. The pawl 56 re-establishes the blocking of the ratchet wheel 54 upon termination of this rotation. The slack in the seat belt 16 is taken-up and wound back onto the spool 14 due to the bias of the second spring 52.

Upon unbuckling of the seat belt 16, the solenoid 110 is deactivated, and the pawl 56 releases the ratchet wheel 54. If sufficient tension is present in the first spring 50, the first spring 50 will drive the ratchet wheel 54 to rotate, and tighten and stress the second spring 52. This is especially apparent if the stress in the second spring 52 has been reduced by a partial retraction of the seat belt 16 while the ratchet wheel 54 is held stationary by the pawl 58. The first spring 50 can drive and tighten the second spring 52 such that the second spring 52 will tend to wind toward a solid, fully-stressed position. Moreover, during rotation of the ratchet 54 by the first spring 50, the ratchet wheel 54 develops a rotational (angular) velocity. The design of the ratchet wheel 54 with its affixed inertia mass member 81 ensures that the terminal rotational velocity of the ratchet wheel 54 is limited.

The relatively high density of inertia mass member 81 and its location on the ratchet wheel 54 is such that a large portion of the overall mass of the rotating ratchet wheel 54 is spaced at a relatively great distance from the axis 22. Thus, the ratchet wheel 54 has an increased overall rotational inertia as compared to a similar ratchet wheel without such a mass member 81. The increase in the inertia results in a retardation or a limitation on the rotational velocity of the ratchet wheel 54 due to the conservation of angular momentum. The ratchet wheel 54 has an increased resistance against being rapidly driven by the first spring 50 and achieves a lower terminal velocity because of the inertia mass member 81.

From the above description of the invention, those skilled in the art will perceive improvements, changes and modifications. Such improvements, changes and modifications within the skill of the art are intended to be covered by the appended claims.

Having described the invention, the following is claimed:

1. A seat belt retractor comprising:

a seat belt storage spool on which a seat belt is wound, said spool being rotatable about a spool axis in belt withdrawal and belt retraction directions;

spring means for biasing said spool to rotate in the belt retraction direction;

wheel means for selectively blocking a tension force of said spring means from acting on said spool to reduce tension in the seat belt, said wheel means being rotatable about a wheel axis when blocking of the tension force does not occur and being stationary when blocking of the tension force does occur;

pawl means for selectively engaging said wheel means to hold said wheel means stationary;

actuator means for moving said pawl means into engagement with said wheel means; and an inertia mass member fixed in a position on said wheel means at a distance spaced from the wheel axis for increasing the rotational inertia of said wheel means and for retarding rotational velocity of said wheel means upon release of said pawl means from said wheel means.

2. A retractor as set forth in claim 1, wherein said wheel means includes a ratchet wheel having a plurality of teeth spaced about an outer periphery of said ratchet wheel, and said inertia mass member is ring-like and is located radially inward of the outer periphery of said ratchet wheel.

3. A retractor as set forth in claim 2, wherein said ratchet wheel has recess surface means for defining a recess located radially inward of said teeth, said recess surface means includes a first surface means located radially outside of said inertia mass member and a second surface means located radially inside of said inertia mass member, and said inertia mass member is between said first and second surface means.

4. A retractor as set forth in claim 3, wherein said ratchet wheel has a disk portion which extends perpendicular to said wheel axis, said recess surface means includes a third surface means which is on said disk portion, and said first and second surface means extend from said third surface means.

5. A retractor as set forth in claim 4, wherein said recess is arc-shaped, said recess surface means includes fourth and fifth surface means which define ends of the arc-shaped recess, and said inertia mass member is arc-shaped and extends along the length of the arc-shaped recess.

6. A retractor as set forth in claim 1, wherein said spring means includes first and second springs acting in series, said first spring has a stronger spring force than a spring force of said second spring, and said wheel means is connected between said first and second springs and blocks the spring force of said first spring when said pawl means holds said wheel means stationary.

7. A retractor as set forth in claim 6, wherein said wheel means includes a ratchet wheel having a plurality of teeth extending about an outer periphery of said ratchet wheel in an annular array, said annular array is hollow, and said inertia mass member is secured to said ratchet wheel inside said hollow annular array.

8. A retractor as set forth in claim 6, wherein said first spring biases said wheel means to rotate and stress said second spring.

9. A seat belt retractor comprising:

a frame;

a seat belt storage spool on which a seat belt is wound, said spool being rotatable relative to said frame about a spool axis in belt withdrawal and belt retraction directions;

first and second springs acting in series between said frame and said spool for biasing said spool to rotate in the belt retraction direction, said first spring having a stronger spring force than a spring force of said second spring;

a ratchet wheel between said first and second springs for blocking the spring force of said first spring from biasing said spool in the belt retraction direction, said ratchet wheel having a plurality of teeth, said ratchet wheel being rotatable about a wheel axis relative to said frame when blocking of the spring force of said first spring does not occur and being stationary relative to said frame when blocking does occur;

a pawl movable to selectively engage a tooth of said ratchet wheel to prevent rotation of said ratchet wheel relative to said frame;

an actuator for moving said pawl into position for engagement with said tooth; and an inertia mass member fixed in position on said ratchet wheel at a distance from said wheel axis for increasing the rotational inertia of said ratchet wheel and for retarding rotational velocity of said ratchet wheel upon release of said pawl from said ratchet wheel.

10. A retractor as set forth in claim 9, wherein said ratchet wheel has an outer periphery and recess surface means for defining a recess extending adjacent said outer periphery of said ratchet wheel, and said inertia mass member is secured inside said recess.

11. A retractor as set forth in claim 10, wherein said recess surface means includes a first surface means located radially outside of said inertia mass member and a second surface means located radially inside of said inertia mass member, and said inertia mass member is between said first and second surface means.

12. A retractor as set forth in claim 11, wherein said ratchet wheel has a disk portion which extends perpendicular to said wheel axis, said recess surface means includes a third surface means which is on said disk portion, and said first and second surface means extend away from said third surface means.

13. A retractor as set forth in claim 9, wherein said ratchet wheel is made of a first material having a first density, and said inertia mass member is made of a second material having a second density, said second density is greater than said first density.

14. A retractor as set forth in claim 9, wherein said ratchet wheel has an outer periphery and said inertia mass member is fastened to said ratchet wheel adjacent said outer periphery and is spaced from said wheel axis for maximizing the increase in said rotational inertia.

15. A retractor as set forth in claim 9, wherein said inertia mass member extends in an arc about said wheel axis.

* * * * *